Patented Nov. 18, 1930

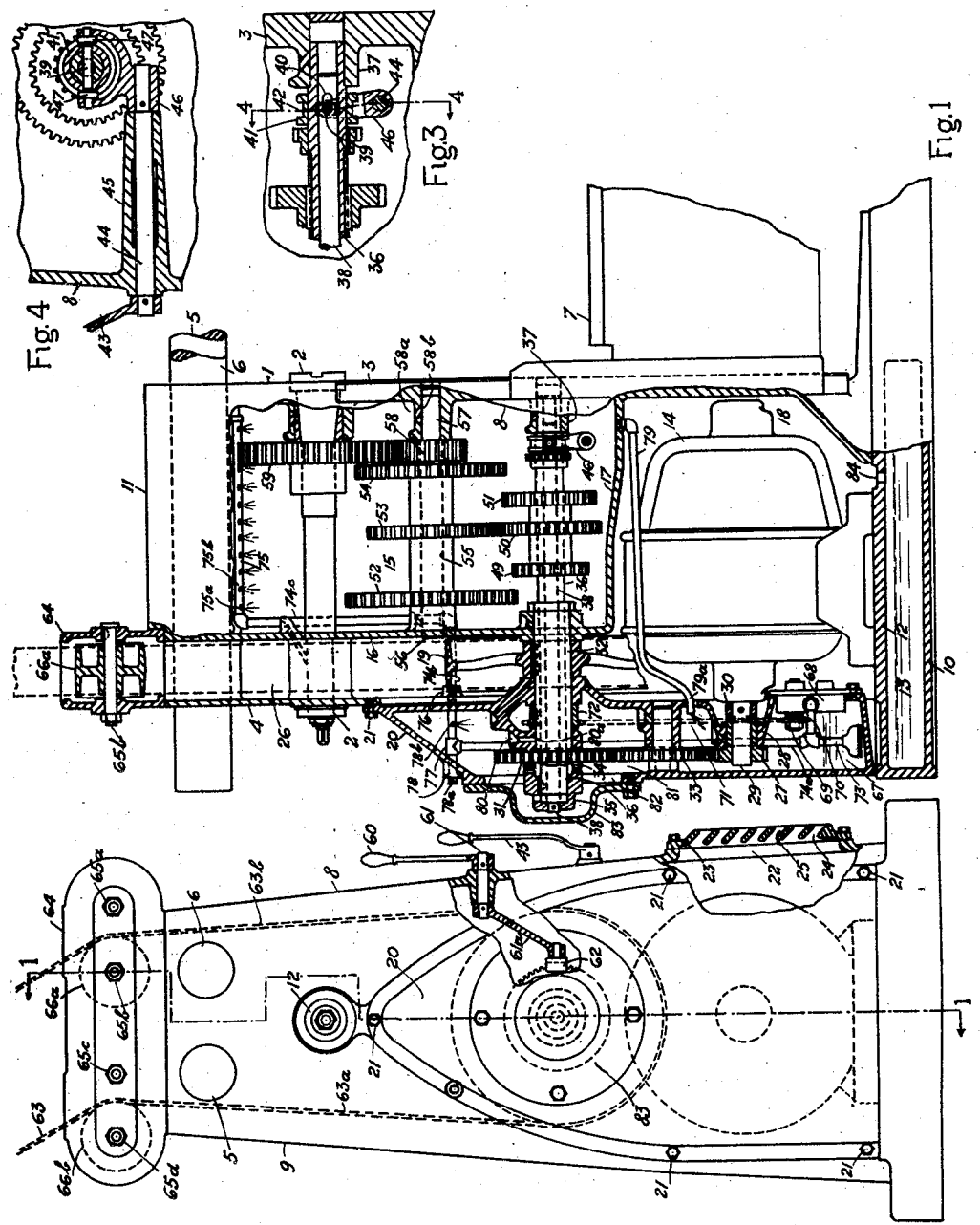

1,782,235

UNITED STATES PATENT OFFICE

EDWARD J. KEARNEY, OF WAUWATOSA, AND JOSEPH B. ARMITAGE, OF MILWAUKEE, WISCONSIN, ASSIGNORS TO KEARNEY & TRECKER CORPORATION, OF WEST ALLIS, WISCONSIN, A CORPORATION OF WISCONSIN

MACHINE-TOOL ORGANIZATION

Application filed January 20, 1926. Serial No. 82,544.

This invention relates to a machine tool organization and particularly to the organization of a column or main supporting structure of a milling machine with the transmission mechanism.

Users of machine tools sometimes require the machine to be belt driven from an exterior or distant source, and sometimes that the machine be motor driven. If motor driven, a great saving in floor space results if the motor can be mounted within the column or structure of the machine. But the resulting close association of the motor and transmission mechanism creates peculiar difficulties, both as to a transmission organization which will permit the manufacturer to furnish the machine in either style, and also as to the heat set up by the motor when the machine is motor driven. The motor heat, added to the heat generated by the transmission mechanism may overheat the machine and cause the frame to warp or the bearings to stick, or cause other difficulties. Ventilating fans have been used for cooling the motor, but are not always adequate or entirely satisfactory.

It is a main purpose of the invention to provide cooling means, without the use of fans or blowers, for a machine tool driven from a motor enclosed in the column structure and closely associated with the transmission mechanism.

Another purpose is to provide cooling means for motor driven tools in an organization such that the cooling passages or some of them serve other purposes in the organization, as for instance to provide an enclosed passageway or guard for the belt driven machines or to provide ventilating means for cooling the transmission mechanism of the belt driven machine, since even in belt driven machines the heating may become objectionable.

In machines in which the motor is closely associated with the transmission mechanism as above described, we have found that it is of great utility to provide a continuous circulation of cooling fluid from the relatively cool base or lower portions of the machine to the upper or relatively hot portions. Such fluid may be a lubricant which sprays over the gears and bearings of the transmission absorbing the localized heat generated in such gears and bearings and dissipating such heat through contact with the relatively cool walls and lower reservoir. Another purpose therefore relates to the combination with a machine tool as previously described of a continuous fluid circulating system in a manner which permits the other purposes herein mentioned and materially aids in cooling the motor driven machine tool.

In machines in which the motor is enclosed within the structure as described, it is necessary to provide access to the motor for inspection and repairs. Another purpose therefore relates to a structure adapted for the other purposes herein mentioned and including a removable portion which cooperates to support portions of the transmission mechanism, or to form a portion of the ventilating passages, or a portion of the cooling fluid passages, and to enclose the motor while permitting free access thereto.

Another purpose is to so organize the machine that it is well adapted to be actuated either by the means of a flexible drive member such as a belt, from a power source, such as a line shaft pulley exterior to, or distant from the machine, or by the means of a motor or similar power source supported by and closely organized with the machine.

Another purpose is to provide a main support in which a motor chamber in a lower portion thereof communicates with the upper portion of the structure by the means of a substantial passageway and is there provided with a substantial opening to the outside air, there being also an opening into the motor chamber at a lower portion of the structure; the passageway providing in effect, a chimney adapted when the motor is operated and the air in the motor chamber is heated from the heat generated by the motor, to create a draft or air current through the motor chamber for the cooling of the motor; air being drawn from the comparatively cool lower air strata, and the heated air being discharged at an upper level of the structure. Such construction also tends to establish and maintain a uniform temperature throughout the machine.

Another purpose is to provide a column structure having a construction as just described, so organized in relation with the transmission mechanism of the machine tool that the upper opening and the passageway serve, when the machine is operated from an outside source such as a line shaft, to provide space for a belt to enter and leave the structure through the upper opening and to be housed within the passageway to drive a pulley enclosed in a lower portion of the passageway, whereby the operator of the machine is protected from the moving belt throughout the zone of his activities in the operation of the machine.

Another purpose is to provide for such a combination as just mentioned, suitable means to guide the moving belt portions and to fix the path thereof within the passageway, irrespective of changes in relative position of the machine and its exterior driving source.

Another purpose is to provide for the suitable lubrication of the various elements requiring lubrication in a machine tool organization such as described above, while preventing the lubricant from coming in contact with portions which would be damaged thereby such for instance as the belt, or the motor, and to suitably organize the lubricating system with a ventilating system, whereby each system assists the other in an improved manner to establish and maintain a uniform temperature throughout the machine.

Another purpose is to provide a structure and organization forming a guard or enclosure, both for a motor and for a moving belt.

Another purpose is to organize a structure providing chambers, openings and passageways suitable for the other purposes mentioned above and of great rigidity and strength. Other objects of the invention will be apparent from this disclosure and its accompanying claims.

In the accompanying drawings, in which like reference characters are used to indicate the same parts throughout the various views, Fig. 1 is a left side elevation of the column of a milling machine of the type generally known as a knee and column type milling machine and in which the invention is embodied, a portion of the view being shown as a section taken along line 1—1 of Fig. 2.

Fig. 2 is a rear elevation of the machine, portions being sectioned to show certain details.

Fig. 3 is an enlarged section of a portion of the clutch operating mechanism.

Fig. 4 is a section taken along line 4—4 of Fig. 3.

A column or main support 1, rotatably supports a tool spindle 2 journaled in a front wall 3 and a rear wall 4, the spindle ends projecting outside the walls for various purposes. The column also supports a plurality of overarms 5 and 6 slidably mounted to be shoved forward in case they are required for supporting the end of a tool arbor or for other reasons, or to be shoved to the rear to be out of the way of the operating activities in case they are not required. Vertically slidable on the front wall 3 is a knee, or work support 7 which ordinarily supports other relatively movable work supports such as a saddle and table, the construction of which being well known is not here shown. A left side wall 8, a right side wall 9, a bottom wall 10 and a top wall 11 are combined with the front and rear walls to provide a hollow box like form for the column. A horizontal wall or rib 12 forms, in combination with other wall portions a chamber 13 in the base of the structure suitable for retaining cutting fluid for use in cooling the work and cutters, or for other purposes, and also provides a support for a motor 14 removably fixed thereon.

A speed change mechanism to be described later in detail is housed within a chamber or portion of the structure generally denoted by the numeral 15 which is formed by portions of the front, top and right and left hand walls and by a vertical wall or rib 16 lying in a plane substantially parallel to the plane of the front wall 3 and spaced substantially distant from the rear wall 4, the bottom wall thereof being provided by a substantially horizontal wall or rib 17, which is spaced sufficiently distant from the horizontal wall 12 to provide vertical space for motor 14.

The various walls described above, or portions thereof form a chamber generally denoted by the numeral 18, within which motor 14 is housed.

In the rear wall 4 is a substantial opening to permit of inserting motor 14 and a pulley 19, the opening being closed by a removable housing or supporting plate member 20, retained when in place by bolts 21.

The left wall 8 is provided near the base of the machine with an opening 22 into the chamber 18 to which is fitted a removable plate 23 having a series of openings 24 formed by a series of downwardly slanted portions 25, the plate serving to permit a large volume of air to pass into chamber 18 while excluding even comparatively small solid objects, and the downward slant of the portions 25 prevents oil or other fluid which might run down the side wall 8 from passing into the chamber.

The construction above described provides a substantial vertical passageway 26 opening into the chamber 18 at its lower end and substantially open at its top which acts as a chimney through which air drawn through the opening 22 and heated in the operation of motor 14 is drawn out of the chamber 18 and discharged through the upper opening, thus continuously drawing in fresh and comparatively cool air through the opening 22 to ventilate and cool the motor, and therefore preventing excessive temperatures in the structure and transmission mechanism to be described.

Spindle 2 may be driven from motor 14 by the following transmission mechanism, which includes the speed change mechanism housed in the chamber 15. A pinion 27 is provided with an elongated shank portion 28 rotatably supported from the member 20 and in axial alignment with the motor shaft 29, which projects into a suitable bore in the shank. Fixed on the motor shaft is a clutch member 30, the clutch member 30 and the end of the shank portion 28 being formed to provide interlocking teeth providing a coupling whereby the pinion is driven from the motor. A gear 31 fixed on a sleeve 32 rotatably supported from the member 20, is driven from pinion 27 through an idler 33. Gear 31 is provided with clutch teeth 34 and a clutch member 35, axially shiftable on but keyed to revolve with a shaft 36, is provided with clutch teeth complementary to the clutch teeth 34 and may be shifted in the one direction to engage therewith or in the other direction to disengage.

The shaft 36 is rotatable in an axial bore of the sleeve 32 through which it extends and is further extended to have a bearing in a boss 37 on the front wall 3. To shift the clutch member 35 a rod 38 is fixed with the member at the one end and is extended toward the front wall 3 in an axial bore in the shaft 36 (see Figs. 1, 3 and 4) to a point near the boss 37, where a pin 39 is passed through the rod and through slotted holes 40 in the shaft 36, the ends being fixed in a spool member 41 slidable on shaft 36 and having an annular groove 42. A hand lever 43, outside the wall 8 is fixed on a shaft 44 pivoted in a boss 45 in the wall 8 and has fixed on its inner end a lever 46 provided with pivoted shoes engaging in the annular groove 42. By the mechanism described clutch member 35 may be shifted in either direction by the movement of the hand lever 43 in the one or the other direction.

Slidably keyed on shaft 36 are gears 49—50—51 respectively engageable one at a time with the gears 52, 53, 54, fixed on a shaft 55 having a bearing at 56 in the wall 16 and at 57 in the wall 3. Also fixed on shaft 55 is a pinion 58 meshing with a gear 59 fixed on spindle 2. The gear pairs 49—52, 50—53, 51—54 are of different ratio and as the gears 49—50—51 are shifted to engage with the other gears the speed of the shaft 55 and of spindle 2 is correspondingly changed, the several gear pairs thus constituting in effect a speed change mechanism. Gears 49—50—51 are fixed together to be shifted simultaneously by the means of a hand lever 60 (see Fig. 2) fixed on the outer end of a short shaft 61 pivoted in wall 8 and having fixed on its inner end a lever 61$^a$ connected to move the gear set by the means of a fork member 62 engaging the sides of gear 50 and pivoted in the lever 61$^a$.

By the means above described the spindle may be driven at a variety of speeds from the motor 14 in the case that the clutch member 35 is engaged.

An alternative drive source is available as follows. The pulley 19 is fixed on the one end of sleeve 32, in a position to stand directly underneath the vertical passageway 26 through which a belt 63 having portions 63$^a$ and 63$^b$ may pass. Means are provided to guide the belt in a predetermined path through the passageway 26 as follows. Bracket 64 is fixed on the column 1 and provides suitable passageways for the belt and also for free passage of the air ascending through the passage 26 into which the passage in the bracket communicates. Removably fixed in the walls of the bracket 64 are bearing pins 65$^a$, 65$^b$, 65$^c$, 65$^d$ so positioned that if the distant pulley with which belt 63 is in driving relationship is situated to the left of the milling machine structure when viewed as in Fig. 2, a pair of suitable guide pulleys 66$^a$ and 66$^b$ may be mounted on the bearing pins 65$^b$ and 65$^d$ as shown in Fig. 2 and will cooperate with the periphery of pulley 19 to restrain the belt portions 63$^a$ and 63$^b$ to paths of movement respectively on opposite sides of the axis of spindle 2, and also on opposite sides of each of the overarms 5 and 6 and outside the path of adjustment of both the overarms, the belt paths being substantially vertical, inside the passage 26. Should the relative position of the milling machine be shifted so that the distant pulley is to the right in Fig. 2, the the pulleys 66$^a$ and 66$^b$ would then be removed from the pins 65$^b$ and 65$^d$ and placed on the pins 65$^a$ and 65$^c$ in which position it is apparent that the spacing of the pins and diameter of the guide pulleys is such as to restrain the belt portions 63$^a$ and 63$^b$ to substantially the same path of movement as before.

The housing member 20 is formed to provide a reservoir 67 suitable to retain a quantity of lubricant. A pump 68 is fixed on the member 20 and may be of any suitable type such as the well known type consisting of intermeshing enclosed gearing. The pump drive shaft 69 is provided with a sprocket 70 driven by the means of a chain 71 from a sprocket 72 fixed on sleeve 32, whereby the pump is driven whenever motion is applied to any portion of the machine either from the motor 14 or the pulley 19. When so driven lubricant from reservoir 67 is elevated to pump 68 through a suction pipe 73 and to upper levels of the structure through delivery pipes 74ᵃ, 74ᵇ, 74ᶜ, and 75. The one end of pipe 74ᵇ is threaded in a boss 76 of the wall 4 into which a pipe 78 is also threaded from the opposite side of the wall. A fitting 77 is provided into which the upper end of the pipe 74ᵃ is threaded, the fitting being provided with a bore through which the pipe 78 passes, the threaded bore for the pipe 78 and for the pipe 74ᵇ being provided with a communicating passage. The fitting 77 is provided with a passage communicating from the pipe 74ᵃ with a hole in the fitting 78. Thus lubricant may pass from the pipe 74ᵃ to the pipe 74ᵇ through the wall 4. The pipe 78 may turn in the fitting 77 and be unscrewed from the wall 4 and removed when it is desired to remove the member 20, a projecting portion 78ᵃ being provided with flats for a wrench for this purpose. The pipe 74ᵇ is fitted closely in the wall 16 where it passes through the wall to prevent lubricant leaking into the passage 26. The pipe 75 is provided with openings 75ᵃ, 75ᵇ, etc. adapted to spray the lubricant over the interior of the walls of chamber 15 and over the gearing contained therein, the motion of the gears therein also assisting together with the openings to more or less completely fill the chamber 15 with flying drops of lubricant. Each of the various bearings associated with the chamber walls are provided with pockets adapted to receive some of the flying drops of lubricant, either directly or as they flow down the sides of the walls. A typical pocket is shown at 58ᵃ for the bearing of shaft 55. Each such pocket communicates with its bearing by the means of a suitable hole as at 58ᵇ.

At a lower level the chamber 15 is provided with a drain consisting of a pipe 79 communicating with the chamber 15 at the one end and at the other end passing through a hole in the inner wall of the member 20 at 79ᵃ, whereby surplus lubricant in the chamber 15 is returned to the reservoir 67 to be again elevated by pump 68, thus providing a continuous circulation from and to the chamber 15 from the reservoir.

The various bearings for the mechanism associated with the member 20 are also each provided with pockets of which the pocket 80 for the bearing of the sleeve 32 is typical and each of the pockets communicates with the associated bearing by the means of a suitable hole or channel such as shown at 80ᵃ for the pocket 80. The fitting 78 is provided with an opening 78ᵇ communicating with the lubricant channel therein and positioned to spray the lubricant either directly into the various pockets or against the side walls from which it may flow into the pockets and onto the gearing associated with member 20. To prevent the lubricant from passing into the motor chamber 18 or upward passageway 26 the inner wall of the member 20 is substantially closed forming together with various other walls a substantially closed chamber generally denoted by the numeral 81, the reservoir 67 being in reality the lower portion of such closed chamber in which the gears, 27, 31 and 33 are housed. Lubricant sprayed from the opening 78ᵇ will therefore eventually find its way back to the reservoir to be used again thus providing a continuous circulation of lubricant for the mechanism within the chamber 81. For purposes of assembling, inspecting and adjusting the mechanism in the chamber 81 an opening is provided at 82, which is ordinarily closed by a removable cover plate 83.

Any lubricant which may enter the motor chamber 18 in spite of the precautions described above will collect on the lower wall 12 thereof and pass through an opening 84 into the chamber 13 to mix with the cutter cooling fluid therein where it will do no harm, but it will be apparent that the quantity of such lubricant will be extremely small.

A preferred embodiment of the invention has now been fully described. It will be apparent that a variety of equivalent forms may be given thereto without departing from the spirit and scope thereof as particularly pointed out in the accompanying claims.

We claim:

1. In a machine tool the combination of a plurality of transmission chambers separated by a ventilating passageway and a motor chamber substantially underneath one of said transmission chambers and connected with said passageway, a speed change transmission mechanism in one of said transmission chambers, gearing in the other of said transmission chambers, and transmission mechanism connecting said gearing to drive said speed change transmission including a shaft passing through said passageway.

2. In a milling machine the combination of a structure including a hollow column providing a front plate, a tool spindle horizontally rotatably journaled in said column at an upper level thereof, a work supporting knee slidably guided in said front plate for vertical adjustment relative to said spindle, said column providing interior partitions forming an upper chamber and a lower chamber each adjacent said front plate and a passageway remote from said front plate and upwardly open and opening at the lower end into said lower chamber, a transmission for said spindle including rate change gearing within said upper chamber and a motor within said lower chamber and connected to actuate said gearing, a lubricating system for said transmission including a reservoir associated with said column and means for elevating lubricant from said reservoir to return thereto over said gearing and over some of the walls of said upper chamber, said column providing an opening into said lower chamber and at a lower level of the column, the last mentioned opening together with said lower chamber and said passageway providing a ventilating channel adapted to pass a current of air through said column remote from said front plate and adjacent to portions of the last mentioned walls of said upper chamber.

EDWARD J. KEARNEY.
JOSEPH B. ARMITAGE.